F. COLE.
ANTIRATTLER FOR AUTOMOBILE DOORS, &c.
APPLICATION FILED DEC. 7, 1911.
1,037,593.
Patented Sept. 3, 1912.
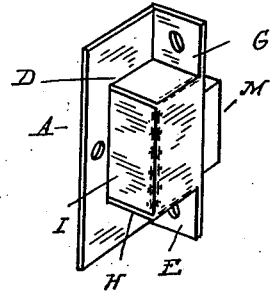
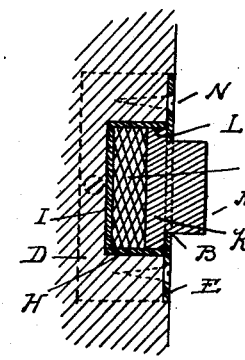
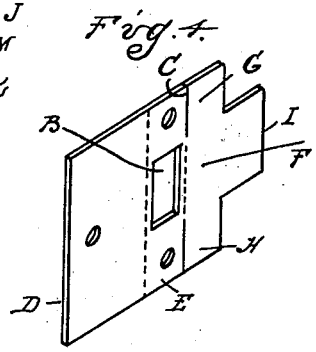
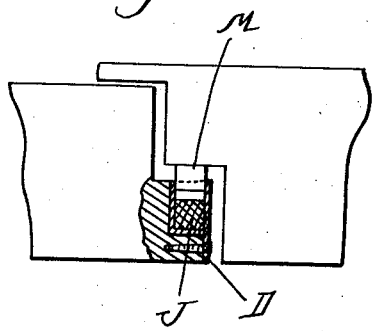
Witnesses
W. K. Ford
James P. Barry
Inventor
Franklin Cole
By Whittemore Hulbert & Whittemore
attys.

UNITED STATES PATENT OFFICE.

FRANKLIN COLE, OF PONTIAC, MICHIGAN.

ANTIRATTLER FOR AUTOMOBILE-DOORS, &c.

1,037,593. Specification of Letters Patent. Patented Sept. 3, 1912.

Application filed December 7, 1911. Serial No. 664,332.

*To all whom it may concern:*

Be it known that I, FRANKLIN COLE, a subject of the King of Great Britain and Ireland, residing at Pontiac, in the county of Oakland and State of Michigan, have invented certain new and useful Improvements in Antirattlers for Automobile-Doors, &c., of which the following is a specification, reference being had therein to the accompanying drawings.

The invention relates to anti-rattlers more particularly designed for use in preventing the rattling of doors and other movable parts on vehicles such as automobiles.

In the present state of the art anti-rattlers have been constructed in which rubber bumpers have been used to resiliently bear upon the movable parts and hold them from rattling. The objections to such constructions are that the face of the rubber is soon worn off, so that the body thereof is not placed under compression and the device therefore loses its effectiveness. On the other hand, various spring metal anti-rattling devices have been used, but have not proven as satisfactory as rubber.

It is the object of the present invention to combine the desirable features of the rubber anti-rattler with those of a construction in which metallic bearing surfaces are employed.

To this end, the invention consists in the construction as hereinafter set forth.

In the drawings,—Figure 1 is a perspective view of the anti-rattler detached; Fig. 2 is a longitudinal section therethrough as applied to the jamb of an automobile door; Fig. 3 is a plan view; and Fig. 4 is a perspective view of the blank from which the metallic case is formed.

A is a metallic casing, preferably formed from a sheet metal blank, which as shown in Fig. 4 is apertured at B and slitted at C, to form bendable portions D E F G H I. These when bent as shown in Fig. 1 form an angle plate of the sections D E, while the sections F G H I form the several sides of a rectangular case. Within this case is arranged a cushion J, of rubber or other resilient material, and in front of this cushion is a metallic member K having shoulders L bearing on the inner side of the rectangular case and a portion M which projects outward through the aperture B. The completed structure is mounted in convenient location, such as on the jamb for an automobile door, and as indicated in Figs. 2 and 3. In this position, when the door is closed it will strike against the projection M, forcing the same inward and compressing the rubber cushion J. The resiliency of this material will react upon the member M and hold the door from rattling.

The construction is one which is simple and inexpensive to manufacture, as the metallic case may be readily struck up by suitable dies and the rubber J and metallic member K can be placed in position before the closing in of the sides of the case, after which there is nothing to become detached or to get out of order. The device is mounted by suitable screws N engaging apertures in the portions D E and extending into the vehicle body.

What I claim as my invention is,—

1. An anti-rattler comprising a metallic casing formed from a sheet metal blank having an aperture in one side thereof, a cushion of solid resilient material inclosed within said casing, and a metallic member bearing against said cushion said member having a portion projecting outward through the aperture in the case.

2. An anti-rattler comprising a casing formed from a sheet metal blank having an aperture intermediate the ends thereof, one of the end portions of the blank being bent to form with the intermediate portion an angle plate, and the other end being bent to form with a portion of the angle plate a rectangular case, a cushion member inclosed within said case, and a metallic member bearing against said cushion member and having a portion projecting outward through the aperture.

In testimony whereof I affix my signature in presence of two witnesses.

FRANKLIN COLE.

Witnesses:
 JAMES P. BARRY,
 C. B. BELKNAP.